(12) United States Patent
Kim

(10) Patent No.: US 9,522,660 B2
(45) Date of Patent: Dec. 20, 2016

(54) HIGH PRESSURE ACCUMULATOR OF BRAKE SYSTEM

(71) Applicant: MANDO CORPORATION, Pyeongtaek-si, Gyeonggi-do (KR)

(72) Inventor: Eun-Mi Kim, Seongnam-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/789,989

(22) Filed: Jul. 2, 2015

(65) Prior Publication Data

US 2016/0001754 A1 Jan. 7, 2016

(30) Foreign Application Priority Data

Jul. 2, 2014 (KR) ........................ 10-2014-0082319

(51) Int. Cl.
*B60T 8/40* (2006.01)
*B60T 13/14* (2006.01)
*B60T 8/36* (2006.01)

(52) U.S. Cl.
CPC ............ *B60T 8/4068* (2013.01); *B60T 13/148* (2013.01); *B60T 8/368* (2013.01)

(58) Field of Classification Search
CPC .................................................. B60T 8/4068
USPC ............................... 303/DIG. 10; 138/30, 37
See application file for complete search history.

(56) References Cited

U.S. PATENT DOCUMENTS

| | | | | |
|---|---|---|---|---|
| 4,514,151 A | * | 4/1985 | Anders | F04B 11/0016 138/30 |
| 6,443,537 B2 | * | 9/2002 | Koyama | 303/DIG. 10 |
| 6,761,150 B2 | * | 7/2004 | Zdroik | F02M 69/465 138/30 |
| 7,441,843 B2 | * | 10/2008 | Otto | B60T 8/368 303/DIG. 10 |

FOREIGN PATENT DOCUMENTS

| | | | | |
|---|---|---|---|---|
| DE | WO 9201867 A1 | * | 2/1992 | ............ B60T 8/4068 |
| DE | 9112163 U1 | * | 1/1993 | ............ B60T 8/4068 |
| DE | WO 9616853 A1 | * | 6/1996 | ............ B60T 8/4068 |
| KR | 20010046429 A | | 6/2001 | |
| KR | 100402270 B1 | | 10/2001 | |

(Continued)

OTHER PUBLICATIONS

EPO machine translation, WO 92/01867 A1, Feb. 1992.*

(Continued)

*Primary Examiner* — Thomas J Williams
(74) *Attorney, Agent, or Firm* — Hauptman Ham, LLP

(57) ABSTRACT

Disclosed herein is a high pressure accumulator of a brake system capable of attenuating pressure pulsation of oil discharged from a pump. The present invention is directed to a high pressure accumulator a brake system in which a damping chamber disposed to attenuate pressure pulsation is optionally partitioned into a plurality of layers to change characteristics of a flow of brake oil so that pressure pulsation can be efficiently reduced. Therefore, it is an aspect of the present invention to provide a high pressure accumulator of a brake system in which an orifice part is integrally formed so that a processing time for installing an orifice separately and an assembling time therefor can be reduced.

6 Claims, 4 Drawing Sheets

(56) References Cited

FOREIGN PATENT DOCUMENTS

| KR | 20030006155 A | 1/2003 |
|---|---|---|
| KR | 20030067842 A | 8/2003 |
| KR | 1020100135236 A | 12/2010 |
| KR | 20140034406 A | 3/2014 |

OTHER PUBLICATIONS

EPO machine translation, WO 96/16853 A1, Jun. 1996.*
Korean Notice of Allowance for corresponding Korean Patent Application No. 10-2014-0082319 issued on Sep. 25, 2015.
Korean Office Action for corresponding Korean Patent Application No. 10-2014-0082319 issued on Mar. 23, 2015.

* cited by examiner

HIGH PRESSURE ACCUMULATOR OF BRAKE SYSTEM

CROSS-REFERENCE TO RELATED APPLICATION

This application claims the benefit of Korean Patent Application No. 2014-0082319, filed on Jul. 2, 2014 in the Korean Intellectual Property Office, the disclosure of which is incorporated herein by reference.

BACKGROUND

1. Field

Embodiments of the present invention relate to a high pressure accumulator, and more particularly, to a high pressure accumulator of a brake system capable of attenuating pressure pulsation of oil discharged from a pump.

2. Description of the Related Art

In general, in an electronic brake system, in order to control brake hydraulic pressure transmitted toward a brake of a vehicle, a plurality of solenoid valves disposed on a modulator block, a low pressure accumulator and a high pressure accumulator that temporarily store oil, and an electronic control unit (ECU) having a pump disposed between the low pressure accumulator and the high pressure accumulator to pump the oil stored in the low pressure accumulator and a motor for driving the pump are provided, the electronic brake system includes the ECU controlling components used to electrically operate these elements.

Such an electronic brake system has been used by employing various structures in which the high pressure accumulator having a predetermined damping space is disposed to reduce pressure pulsation generated as liquid pressure of brake oil discharged from the pump is formed at a high pressure and an orifice part is disposed in an outport discharged through the high pressure accumulator. For example, Korean Unexamined Patent Application Publication No. 10-2001-0046429 discloses a structure for reducing pressure pulsation by separately disposing an elastic member and an orifice in a high pressure accumulator. Also, Korean Unexamined Patent Application Publication No. 10-2010-0135236 discloses a configuration in which a pulsation attenuation capsule having an elastic force is disposed in a high pressure accumulator to reduce pressure pulsation and an orifice is separately disposed in the high pressure accumulator. That is, referring to the disclosed literatures, an orifice part is obligatorily mounted in an outport discharged through the high pressure accumulator to attenuate pressure pulsation.

However, since the orifice should be separately assembled, as mentioned above, an additionally processing time for installing the orifice and an assembling time therefor increase, and of course, cost increases.

In addition, pressure pulsation attenuation caused by elastic deformation is induced by installing an elastic member formed of a spring or a rubber material in the high pressure accumulator. Thus, there is a problem in that the function may be lowered by lowered durability of components when they are used for a long time and a pressure pulsation attenuation effect is limited.

SUMMARY

Therefore, it is an aspect of the present invention to provide a high pressure accumulator of a brake system in which an orifice part is integrally formed so that a processing time for installing an orifice separately and an assembling time therefor can be reduced.

It is another aspect of the present invention to provide a high pressure accumulator of a brake system in which a damping chamber disposed to attenuate pressure pulsation is optionally partitioned into a plurality of layers to change characteristics of a flow of brake oil so that pressure pulsation can be efficiently reduced.

Additional aspects of the invention will be set forth in part in the description which follows and, in part, will be obvious from the description, or may be learned by practice of the invention.

In accordance with one aspect of the present invention, a high pressure accumulator of a brake system disposed on a modulator block to reduce pressure pulsation of brake oil pressed by driving of a pump and pumped, the high pressure accumulator includes: a closing member that closes one end of a bore having one opened end and is in communication with an inport through which the brake oil is introduced and an outport through which the brake oil is discharged; and a damping housing that is installed in the bore and has a damping chamber formed therein in communication with the inport and the outport, wherein an orifice part may be formed integrally with the damping housing in a portion in which the brake oil is discharged through the outport, and a damping member may be installed in the damping housing and may partition the damping chamber into a plurality of layers so that the partitioned plurality of layers may be in communication with each other, and the damping member may include a body part having one opened side to partition the damping chamber into a plurality of layers and a connection hole formed in a bottom surface of the body part in communication with the adjacent damping chamber partitioned by the body part, and an inclined part may be formed on the bottom surface of the body part so that the brake oil may easily flow into the adjacent damping chamber, and the connection hole may be formed in distal ends of the inclined part.

The orifice part may include an insertion part inserted into and coupled to the outport and an orifice formed in the insertion part so that the damping chamber and the outport are in communication with each other.

A stepped part for supporting the damping member may be formed in the damping housing.

A plurality of damping members may be provided, the plurality of damping member being stacked and disposed in series.

An introduction hole that is in communication with the inport may be formed in the damping member disposed in a position corresponding to the inport.

The plurality of damping chambers, each of which is partitioned into a plurality of layers by the damping members, may be optionally formed to have the same heights according to heights of the damping members or may be optionally formed to have different heights.

The plurality of damping members may have diameters at which they correspond to each other, and may be installed in the damping housing, and one end of each of the damping housing and the damping member may be pressed in and coupled to the closing member.

A coupling jaw corresponding to an inner diameter of each of the damping members may be formed at an inside of the closing member.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
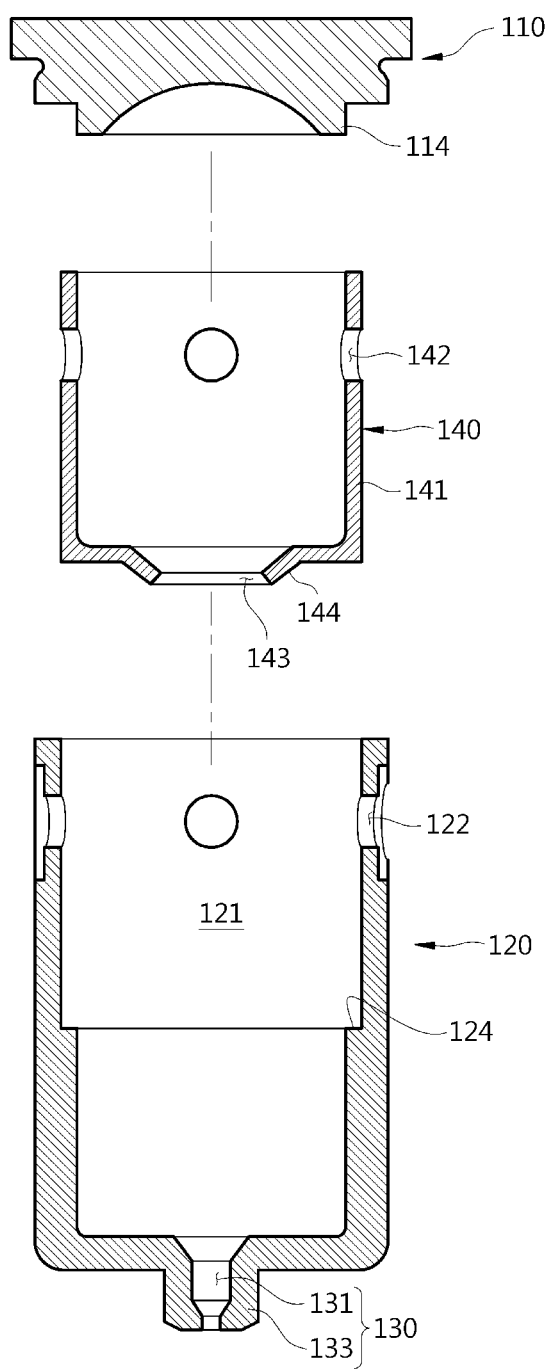
FIG. 1 is an assembling cross-sectional view illustrating a state in which a high pressure accumulator of a brake system is assembled, in accordance with an embodiment of the present invention.

Reference will now be made in detail to the embodiments of the present invention, examples of which are illustrated in the accompanying drawings, wherein like reference numerals refer to like elements throughout. The following embodiment is proposed to sufficiently convey the spirit of the invention to one of ordinary skill in the art. The invention is not limited by the proposed embodiment but may be embodied in different shapes. In the drawings, for clarity, illustration of unrelated parts to description is omitted, and for understanding, sizes of components may be slightly exaggerated.

Figure 2:
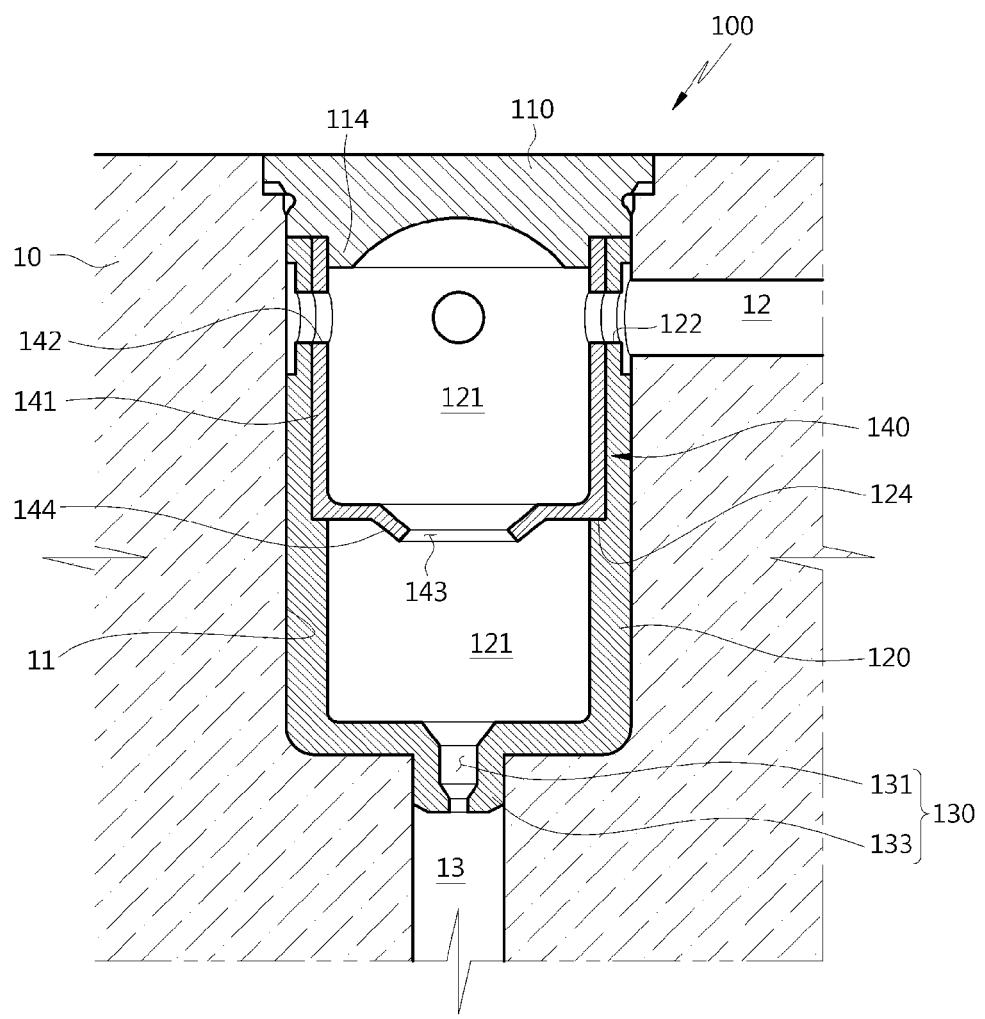
FIG. 2 is a cross-sectional view illustrating a state in which the high pressure accumulator of the brake system illustrated in FIG. 1 is assembled to a bore in a modulator block.

FIG. 1 is an assembling cross-sectional view illustrating a state in which a high pressure accumulator of a brake system is assembled, in accordance with an embodiment of the present invention, and FIG. 2 is a cross-sectional view illustrating a state in which the high pressure accumulator of the brake system illustrated in FIG. 1 is assembled to a bore in a modulator block.

Referring to the drawings, a high pressure accumulator 100 of a brake system according to an embodiment of the present invention is installed on a modulator block 10 of an electronic brake system (not shown) and attenuates pressure pulsation. In this case, the electronic brake system (not shown) is a device in which in order to control brake hydraulic pressure transmitted toward a brake of a vehicle, a plurality of flow paths are formed in the modulator block 10, a solenoid valve, a low pressure and a high pressure accumulators, a pump, and a motor are installed, and thus are electronically controlled. Such an electronic brake system is a well-known technology and thus, a detailed description thereof will be omitted.

The high pressure accumulator 100 according to an embodiment of the present invention is installed in a bore 11 formed in the modulator block 10 in communication with an inport 12 through which high-pressure brake oil discharged from the pump is introduced and an outport 13 through which the introduced brake oil is discharged. In more detail, the high pressure accumulator 100 includes a closing member 110 that closes one end of the bore 11 having one opened end formed in a cylindrical shape and a damping housing 120 that is installed in the bore 11 and has a damping chamber 121 formed therein in communication with the inport 12 and the outport 13.

The closing member 110 is installed to close the opened end of the bore 11 so that an inside of the bore 11 may be formed by the damping chamber 121 together with the damping housing 120. A coupling protrusion 114 through which the closing member 110 may be coupled to a damping member 140 that will be described later is formed at an inside of the closing member 110. Hereinafter, the coupling protrusion 114 will be described again.

The damping housing 120 is installed in the bore 11, has the opened end in the cylindrical shape, and has the damping chamber 121 formed therein. In the damping housing 120, an inlet 122 is formed in a position corresponding to the inport 12 so that the brake oil may be introduced through the inport 12, and an orifice part 130 is formed integrally with the damping housing 120 in a position corresponding to the outport 13 so that the introduced brake oil may be discharged toward the outport 13.

The orifice part 130 includes an insertion part 133 inserted into and coupled to the outport 13 and an orifice 131 formed in the insertion part 133 so that the damping chamber 121 and the outport 13 are in communication with each other. As the orifice part 130 is formed integrally with the damping housing 120, an orifice does not need to be separately installed compared to the related art so that a processing time and an assembling time may be reduced.

Meanwhile, the damping member 140 is installed within the damping housing 120 so that the damping chamber 121 may be partitioned into a plurality of layers and the partitioned plurality of layers may be in communication with each other. In this case, a stepped part 124 for stably supporting the damping member 140 is formed in an inner side surface of the damping housing 120.

The damping member 140 includes a body part 141 having one opened side to partition the damping chamber 121 into a plurality of layers and a connection hole 143 formed in a bottom surface of the body part 141 in communication with the adjacent damping chamber 121 partitioned by the body part 141. That is, as illustrated in the drawings, the damping member 140 is disposed in the damping housing 120 to partition the damping chamber 121 into two layers so that pressure pulsation of the brake oil introduced under high pressure may be attenuated in two layers and a pressure pulsation attenuation effect may be improved.

Also, an inclined part 144 is formed on a bottom surface of the damping member 140 so that the brake oil may easily flow into the adjacent damping chamber 121. The inclined part 144 is formed to be inclined in a direction through which the brake oil flows, and the connection hole 143 is formed in distal ends of the inclined part 144. Thus, the brake oil flows toward the outport 13 by the inclined part 14 so that, although the damping chamber 121 is partitioned into the plurality of layers, the brake oil may flow smoothly.

The damping member 140 is installed in the damping housing 120 and is pressed in and coupled to the closing member 110 together with the damping housing 120. As described above, the damping member 140 is pressed in and coupled to the coupling protrusion 114 of the closing member 110. Thus, the coupling protrusion 114 is formed to have a diameter corresponding to an inner diameter of the damping member 140. In this case, the damping member 140 is pressed in and coupled to the closing member 110 together with the damping housing 120. However, the present invention is not limited thereto, and the damping housing 120 may also be directly pressed in and coupled to the closing member 110. When the damping member 140 is pressed in and coupled to the closing member 110 together with the damping housing 120, an introduction hole 142 is formed in a position of the damping member 140 corresponding to the inlet 122 formed in the damping housing 120 so that the brake oil may be introduced into the damping housing 120 through the inport 12. If the damping housing 120 is directly pressed in and coupled to the closing member 110, the damping member 140 is installed to be located under the inlet 122 formed in the damping housing 120.

In the above-described high pressure accumulator 100 of the brake system, the orifice part 130 is integrally formed so that a processing time for installing an orifice separately and an assembling time therefor may be reduced. Also, the damping chamber 121 is partitioned into a plurality of layers so that pressure pulsation may efficiently be reduced. Also, the damping chamber 121 is formed of a material having rigidity, for example, steel or a plastic material. Thus, although the damping chamber 121 is used for a long term, durability of the damping chamber 121 is not lowered, and as the function of partitioning the damping chamber 121 into a plurality of layers is permanently maintained, a continuous pressure pulsation attenuation function may be performed.

Figure 3:
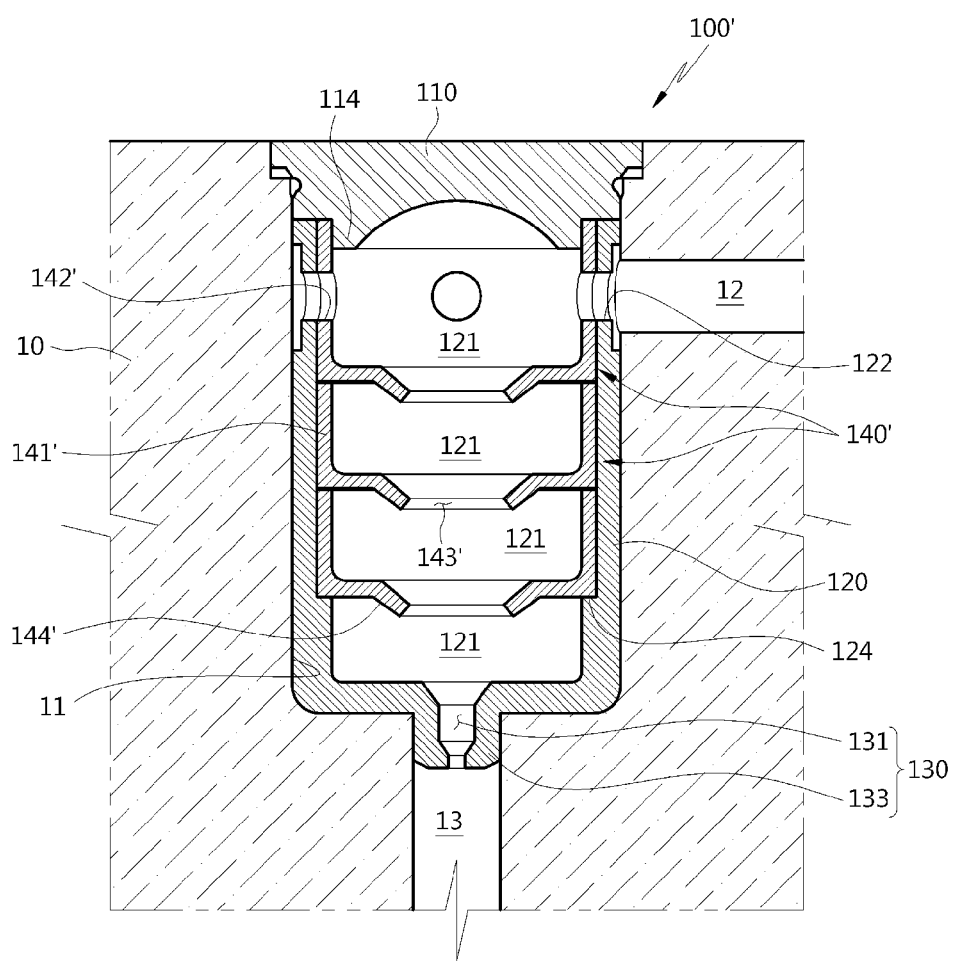
FIG. 3 is a cross-sectional view illustrating a high pressure accumulator of a brake system in accordance with another embodiment of the present invention.

Meanwhile, the high pressure accumulator 100 of the brake system according to an embodiment of the present invention includes one damping member 140 to partition the damping housing 120 into two layers. However, the present invention is not limited thereto, and two or more damping members may be disposed to optionally increase the number of layers of the damping housing 120. For example, FIG. 3 illustrates a high pressure accumulator 100' having two or more damping members 140' of a brake system according to another embodiment of the present invention. Here, like reference numerals that are the same as those of the previous drawings are used for like elements having the same functions.

The high pressure accumulator 100' of the brake system according to the current embodiment includes a damping housing 120 that is installed in a bore 11 in a modulator block 10 and has an orifice part 130 integrally formed in the damping housing 120, a closing member 110 that closes one end of the bore 11, and at least two or more damping members 140' that are installed in the damping housing 120 and partition the damping chamber 121 into a plurality of layers. Three damping members 140' are provided, as illustrated in the drawings, and are stacked and disposed in series.

In this case, the plurality of damping members 140' have diameters at which they correspond to each other, and the damping member 140' disposed at the lowermost end is supported by the stepped part 124 formed in the damping housing 120, and the damping member 140' disposed at the uppermost end is pressed in and coupled to the closing member 110. Also, an introduction hole 142' that is in communication with the inport 12 is formed in the damping member 140' disposed in the position corresponding to the inport 12.

Figure 4:
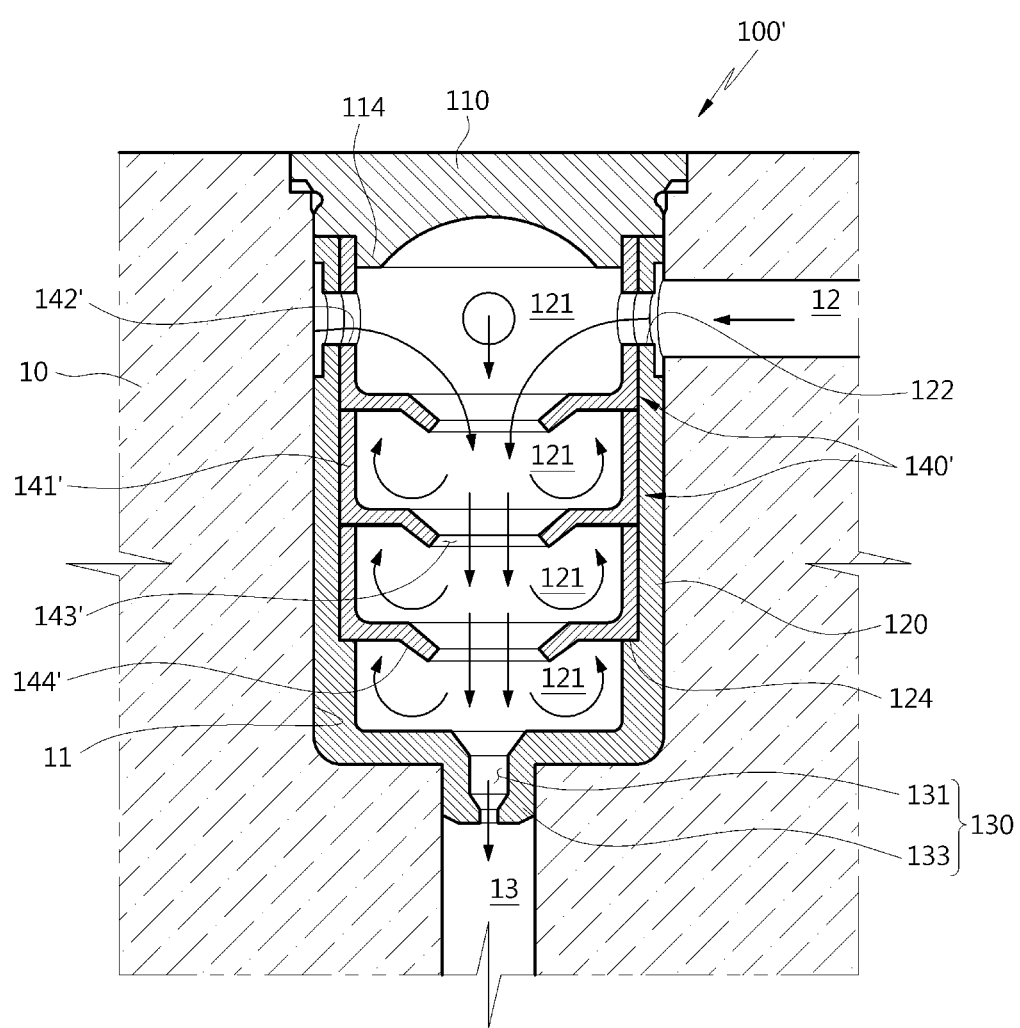
FIG. 4 is a view illustrating a flow of brake oil, pressure pulsation of which is attenuated through the high pressure accumulator of the brake system illustrated in FIG. 3.

Each damping member 140' includes a body part 141', an inclined part 144' formed on a bottom surface of the body part 141' to be inclined, and a connection hole 143' formed in the inclined part 144'. Each damping member 140' is installed in the damping housing 120 so that the damping chamber 121 partitioned into four layers by the damping member 140' are in communication with the connection hole 143'. In this case, the damping chamber 121 partitioned into a plurality of layers by the damping member 140' may be optionally formed to have the same heights according to heights of the damping members 140' or may be optionally formed to have different heights. That is, the heights of the damping members 140' may differ so that heights of the partitioned layers of the damping chamber 121 may be changed and thus characteristics of a fluid flow may be changed. Thus, as illustrated in FIG. 4, brake oil pumped by a pump (not shown) is introduced into the damping chamber 121 through the inport 12 so that pressure pulsation may be attenuated through the damping chamber 121 that are primarily partitioned into four layers and may be secondarily reduced through the orifice part 130 formed integrally with the damping housing 120 and thus the brake oil is discharged through the outport 13. Thus, pressure pulsation and noise generated by the high-pressure brake oil may efficiently be reduced.

The above-described high pressure accumulator 100' according to the current embodiment may be used to reduce pressure pulsation using various structures in which the damping chamber 121 is partitioned into four layers to reduce pressure pulsation of the brake oil. However, the number of layers of the damping chamber 121 may be optionally increased/decreased according to a capacity of a chamber of the brake system and the size of the bore 11 may be changed.

As described above, in a high pressure accumulator of a brake system according to the one or more of the embodiments of the present invention, an orifice part for reducing pressure pulsation is formed integrally with a damping housing so that a process of installing an orifice separately can be removed and thus an assembling time and a processing time can be reduced compared to the related art.

In addition, a damping chamber formed in the high pressure accumulator is optionally partitioned into a plurality of layers according to a capacity of a chamber so that pressure pulsation can efficiently be reduced. In this case, a damping member that partitions the damping chamber into a plurality of layers is formed of a material having rigidity so that, although the damping member is used for a long term, a problem relating to lowering of the function of the damping member caused by lowered durability can be solved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A high pressure accumulator of a brake system disposed on a modulator block to reduce pressure pulsation of brake oil pressed by driving of a pump and pumped, the high pressure accumulator comprising:
   a closing member that closes one end of a bore having one opened end and is in communication with an inport through which the brake oil is introduced and an outport through which the brake oil is discharged; and
   a damping housing that is installed in the bore and has a damping chamber formed therein in communication with the inport and the outport,
   wherein an orifice part is formed integrally with the damping housing in a portion in which the brake oil is discharged through the outport, and
   a damping member is installed in the damping housing and partitions the damping chamber into a plurality of damping chambers so that the partitioned plurality of damping chambers is in communication with each other, and
   the damping member comprises a body part having one opened side to partition the damping chamber into the plurality of damping chambers and a connection hole formed in a bottom surface of the body part in communication with the adjacent damping chamber partitioned by the body part, and an inclined part is formed on the bottom surface of the body part so that the brake oil easily flows into the adjacent damping chamber, and the connection hole is formed in distal ends of the inclined part, wherein a plurality of damping members is provided, the plurality of damping member being stacked and disposed in series, and wherein the plurality of damping members has diameters at which they correspond to each other, and are installed in the damping housing, and one end of one of the damping members is pressed in and coupled to the closing member.

2. The high pressure accumulator of claim 1, wherein the orifice part comprises an insertion part inserted into and coupled to the outport and an orifice formed in the insertion part so that the damping chamber and the outport are in communication with each other.

3. The high pressure accumulator of claim 1, wherein a stepped part for supporting the damping member is formed in the damping housing.

4. The high pressure accumulator of claim 1, wherein an introduction hole that is in communication with the inport is formed in the damping member disposed in a position corresponding to the inport.

5. The high pressure accumulator of claim 1, wherein the plurality of damping chambers, each of which is partitioned into the plurality of damping chambers by the damping members, are optionally formed to have the same heights according to heights of the damping members or are optionally formed to have different heights.

6. The high pressure accumulator of claim 1, wherein a coupling jaw corresponding to an inner diameter of each of the damping members is formed at an inside of the closing member.

* * * * *